(12) United States Patent
Karman (10) Patent No.: US 7,719,552 B2
(45) Date of Patent: May 18, 2010

(54) IMAGE QUALITY IN A 3D IMAGE DISPLAY DEVICE

(75) Inventor: Gerardus P. Karman, 'S-Hertogenbosch (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 833 days.

(21) Appl. No.: 10/598,018

(22) PCT Filed: Feb. 17, 2005

(86) PCT No.: PCT/IB2005/050599

§ 371 (c)(1),
(2), (4) Date: Aug. 16, 2006

(87) PCT Pub. No.: WO2005/081546

PCT Pub. Date: Sep. 1, 2005

(65) Prior Publication Data

US 2008/0150936 A1    Jun. 26, 2008

(30) Foreign Application Priority Data

Feb. 21, 2004    (GB) .................................. 0403932.7

(51) Int. Cl.
G09G 5/02    (2006.01)
G09G 5/00    (2006.01)
G09G 3/00    (2006.01)
G02F 1/1335    (2006.01)
H04N 13/00    (2006.01)

(52) U.S. Cl. ................................ 345/698; 345/7; 345/8; 345/9; 345/32; 345/695; 349/15; 348/42

(58) Field of Classification Search .................. 345/32, 345/695, 698; 348/42–60; 349/15
See application file for complete search history.

(56) References Cited

U.S. PATENT DOCUMENTS

| 4,959,641 | A | * | 9/1990 | Bass et al. ..................... 345/6 |
| 5,083,199 | A |   | 1/1992 | Borner |
| 5,943,166 | A | * | 8/1999 | Hoshi et al. ................. 359/475 |

(Continued)

FOREIGN PATENT DOCUMENTS

EP    0262955 A2    4/1988

(Continued)

OTHER PUBLICATIONS

ISR: PCT/IB05/050599.

(Continued)

*Primary Examiner*—Bipin Shalwala
*Assistant Examiner*—Ilana Spar (57) ABSTRACT

A display device for displaying a three dimensional image such that different views are displayed according to the viewing angle, the display device including a display panel having a plurality of separately addressable pixels for displaying said image. The pixels are grouped such that different pixels in a group correspond to different views of the image, each pixel in a group being positioned relative to a respective discrete light source, and pixel being separately controllable to vary an optical characteristic of each pixel to generate an image according to received image data. The pixel sizes within a group vary as a function of the viewing angle of the pixels with respect to the respective light source, so that the characteristics of the different views are independent of viewing angle.

24 Claims, 8 Drawing Sheets

U.S. PATENT DOCUMENTS

| | | | |
|---|---|---|---|
| 6,049,424 A | | 4/2000 | Homagishi |
| 6,115,007 A | * | 9/2000 | Yamazaki ........................ 345/7 |
| 6,172,807 B1 | * | 1/2001 | Akamatsu .................... 359/462 |
| 7,495,638 B2 | * | 2/2009 | Lamvik et al. ................. 345/76 |

FOREIGN PATENT DOCUMENTS

| | | | |
|---|---|---|---|
| EP | 0263955 A2 | 4/1988 |
| WO | 0120386 A2 | 3/2001 |

OTHER PUBLICATIONS

Written Opinion: PCT/IB05/050599.

* cited by examiner

IMAGE QUALITY IN A 3D IMAGE DISPLAY DEVICE

The present invention relates to display devices, and in particular to display devices adapted to display three dimensional or stereoscopic images.

The generation of three-dimensional images generally requires that a display device is capable of providing a different view to the left and the right eye of a user of the display device. This can be achieved by providing a separate image directly to each eye of the user by use of specially constructed goggles. In one example, a display provides alternating left and right views in a time sequential manner, which views are admitted to a corresponding eye of the viewer by synchronised viewing goggles.

In another example, such as that described in U.S. Pat. No. 6,172,807, time sequential synchronisation of left and right eye views is provided by way of a spatial modulation element in the form of an LCD panel which alternately occludes left and right eye views of a display using parallax. In order to correctly occlude left and right eye views, the system of U.S. Pat. No. '807 has to constantly track the position of the viewer relative to the display device.

In contradistinction, the present invention relates to classes of display devices where different views of an image can be seen according to the viewing angle relative to a single display panel without necessarily requiring tracking of user position. Hereinafter, these will be referred to generally as 3D display devices.

One known class of such 3D display devices is the liquid crystal display in which the parallax barrier approach is implemented. Such a system is illustrated in FIG. 1.

Figure 1:
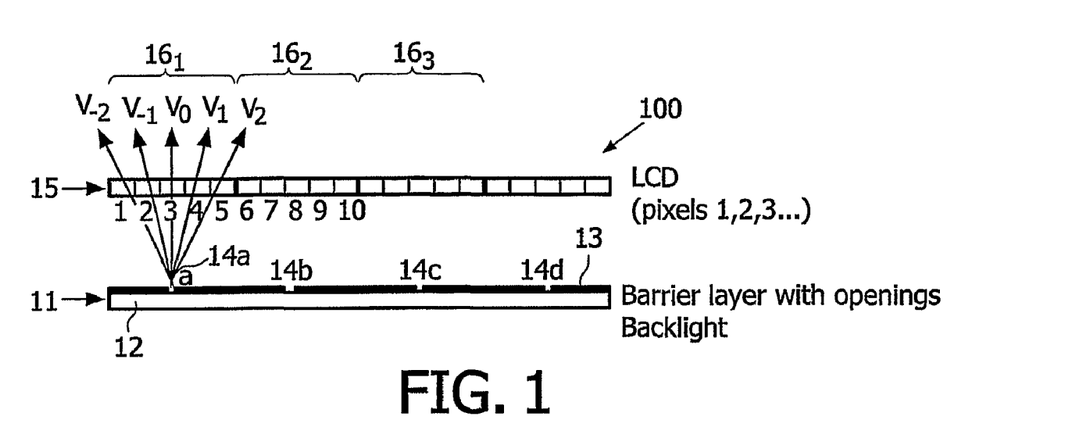
FIG. 1 shows a schematic cross-sectional view of an existing design of LCD device that uses the parallax barrier approach to display three dimensional images.

With reference to FIG. 1, a display device 100 of the parallax barrier type comprises a back panel 11 that provides a plurality of discrete light sources. As shown, the back panel 11 may be formed by way of an areal light source 12 (such as a photoluminescent panel) covered with an opaque mask or barrier layer 13 having a plurality of slits 14a to 14d distributed across its surface. Each of the slits 14 then acts as a line source of light.

A liquid crystal display panel (LCD) 15 comprises a plurality of pixels (eg. numbered $P_1$ to $P_{10}$ in FIG. 1) which are separately addressable by electrical signals according to known techniques in order to vary their respective light transmission characteristics. The back panel 11 is closely positioned with respect to the LCD panel 15 such that each of the line sources 14 of light corresponds to a group 16 of pixels. For example, pixels $P_1$ to $P_5$ shown as group $16_1$ correspond to slit 14a, pixels $P_6$ to $P_{10}$ shown as group $16_2$ correspond to slit 14b, etc.

Each pixel of a group 16 of pixels corresponds to one view V of a plurality of possible views ($V_{-2}, V_{-1}, V_0, V_1, V_2$) of an image such that the respective line source 14a can be viewed through one of the pixels $P_1$ to $P_5$ corresponding to that view. The number of pixels in each group 16 determines the number of views of an image present, which is five in the arrangement shown. The larger the number of views, the more realistic the 3D effect becomes and the more oblique viewing angles are provided.

Throughout the present specification, we shall refer to the 'image' being displayed as the overall image being generated by all pixels in the display panel, which image is made up of a plurality of 'views' as determined by the particular viewing angle.

Figure 2:
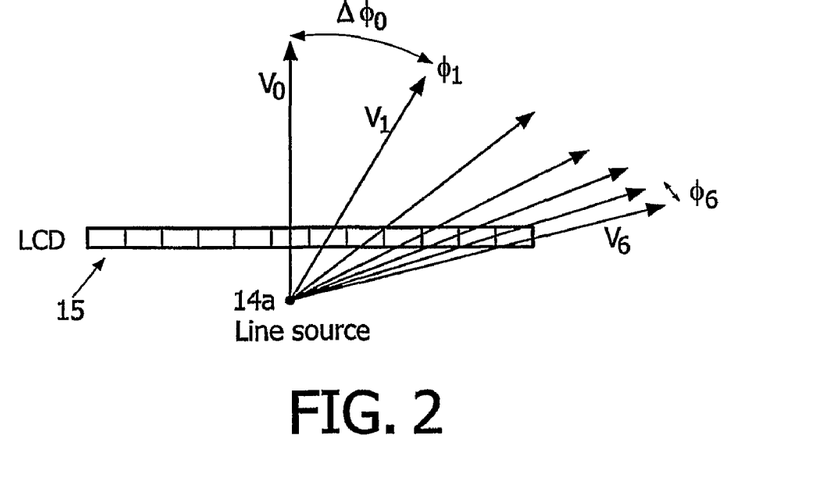
FIG. 2 shows a schematic cross-sectional diagram useful in illustrating the decrease in angular width of views of a light source with increasing viewing angle in an existing parallax barrier LCD device.

Two main problems exist with this prior art arrangement. The angular size of any given view of an image as perceived by the viewer, will be a function of the viewing angle $\phi$. As illustrated in FIG. 2, given views $V_0, V_1, \ldots V_6$ become more closely separated for oblique viewing angles (e.g. $\phi_6$) than for views at smaller viewing angles (e.g. $\phi_1$). In terms of the arrangement in FIG. 1 for example, a viewer would perceive the angular size of view of the light source 14a as viewed through pixel $P_3$ to be greater than the angular size of view of light source 14a as viewed through pixel $P_5$. As a consequence the viewer would experience a variable amount of 3D effect when moving between the views which would degrade the quality of the resulting image.

The diminishing angular separation $\Delta\phi_n$ between views, with increasing oblique viewing angle $\phi_n$, leads to a reduction in the brightness of any given discrete light source 14 as perceived by the viewer. Therefore, the perceived intensity of the viewed source will also be a function of viewing angle. This results in a dimmer image when viewed at more oblique angles (e.g. $\phi_6$), and gives rise to unwanted intensity artefacts when observing the different views of the image.

It is an object of the present invention to overcome or mitigate the variation in angular separation $\Delta\phi_n$ of views with increasing viewing angle $\phi_n$. It is a further object of the present invention to minimise unwanted intensity artefacts in a display device for displaying three dimensional images in which different views of the image are displayed according to the viewing angle.

According to one aspect, the present invention provides a display device for displaying a three dimensional image such that different views are displayed according to the viewing angle, the display device including:

a display panel having a plurality of separately addressable pixels for displaying said image, the pixels being grouped such that different pixels in a group correspond to different views of the image, each pixel in a group being positioned relative to a respective discrete light source, and each pixel being separately controllable to vary an optical characteristic of each pixel to generate an image according to received image data;

wherein the sizes of the pixels within a group vary as a function of the viewing angle of the pixels with respect to the respective light source.

According to another aspect, the present invention provides a method for displaying a three dimensional image on a display device such that different views of the image are displayed according to the viewing angle, the method comprising the steps of:

processing image data to form pixel intensity data values for each one of a plurality of separately addressable pixels in a display panel, the pixels being grouped such that different pixels in a group correspond to different views of the image, and each pixel in a group being positioned relative to a respective discrete light source, the pixel intensity data values each for controlling an optical characteristic of a respective pixel to generate the image;

wherein the sizes of the pixels within a group vary as a function of the viewing angle of the pixels with respect to the respective light source.

Embodiments of the present invention will now be described by way of example and with reference to the accompanying drawings in which.

Figure 3:
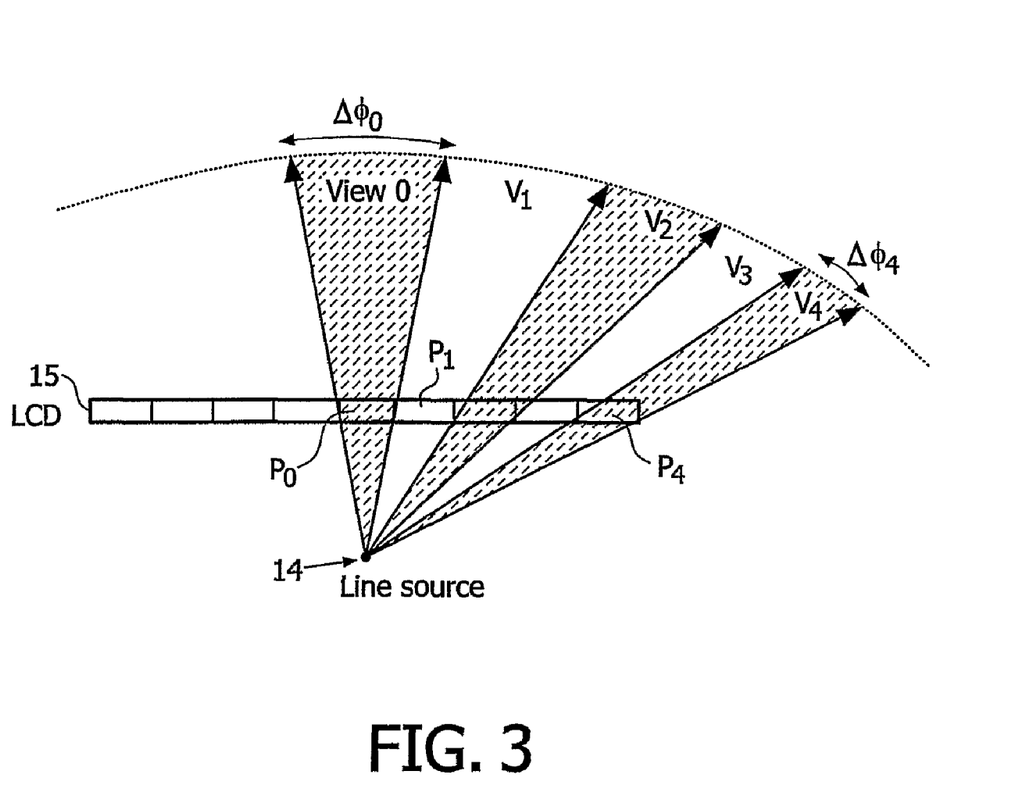
FIG. 3 shows a schematic diagram illustrating the angular width of each view of a light source as determined by left and right edges of pixels through which the light source is viewed.

With reference to FIG. 1, the basic function of an existing parallax barrier type, three dimensional image display device has already been described. In FIGS. 2 and 3 there is shown a prior art 3D display device clearly showing the effect of decreasing angular size $\Delta\phi$ of views $V_0, V_1, \ldots V_6$ of a light source with increasing viewing angle $\phi_n$.

As illustrated in FIG. 3 the angular size $\Delta\phi_n$ of the viewing cone of each view $V_0, V_1, V_2, V_3, V_4$ becomes smaller for higher n, where n is the pixel number counting from the pixel $P_0$ that is centred over the light source 14. In an ideal display device the angular size $\Delta\phi_n$ of the viewing cone would be selected such that the viewer's left eye would see one view and the viewer's, right eye would see the next adjacent view. For example, suppose the display device is viewed from a distance of 70 cm. Given the average separation between the left and right eye is 6 cm, the left and right eye subtend an angle $\Delta\phi_{eye}$=arctan (6/70)=5 degrees. Hence, the display device would be designed such that $\Delta\phi_0$=$\Delta\phi_{eye}$=5 degrees, so that when viewed at normal incidence, the left and right eyes would see view $V_0$ and view $V_1$ respectively. In this way, a proper 3D image would be perceived.

At more oblique angles however, $\Delta\phi_n$ becomes progressively smaller than $\Delta\phi_{eye}$, leading to views being present between the viewing positions of the eyes. The pixels that generate these 'superfluous' views are not used efficiently and the transition from an optimum of two views per viewer (one per eye) to 3, 4, 5 or more views per viewer does not produce a natural image. In this case the viewer experiences a variable amount of 3D effect when moving his viewing position from side to side across the display.

The decreasing angular size $\Delta\phi_n$ of the viewing cone of each view $V_0, V_1, V_2, V_3, V_4$ for higher n, means that the brightness of each of the n views becomes less for higher values of n, assuming that the light source 14 is an isotropic emitter. The viewer will therefore experience a lower brightness for the more oblique views (e.g. $V_3, V_4$) than for the orthogonal view $V_0$. This results in some undesirable artefacts when observing the different views of the image being displayed.

The present invention provides a solution to the problems of existing parallax barrier type 3D display devices, in that it substantially equalises the angular sizes of views so as to be independent of viewing angle $\phi_n$ and substantially normalises the intensities of the views so as to be independent of viewing angle $\phi_n$. This is all achieved without the need for complex intensity compensation devices and/or display software to control the intensities of the views V as displayed by the pixels as a function of viewing angle $\phi_n$.

Figure 4:
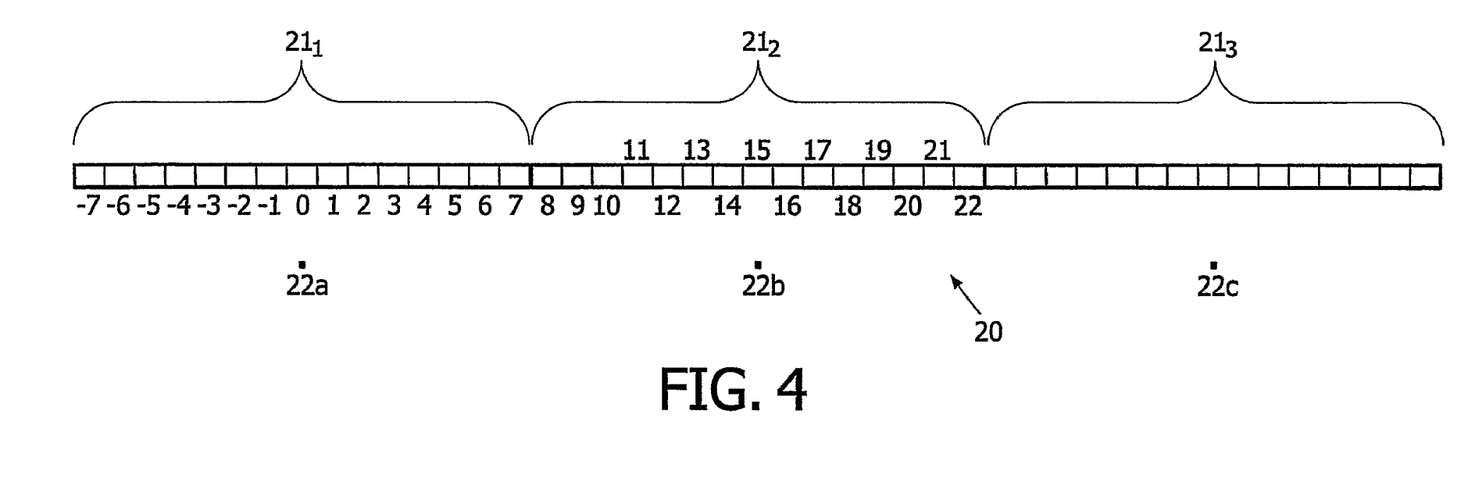
FIG. 4 shows a schematic cross-sectional view of a design of an LCD display panel having varying pixel sizes.

A display panel 20 of the present invention is shown in FIG. 4. In preferred arrangements, the panel 20 has a plurality of separately addressable pixels $P_{-7}, P_{-6} \ldots P_{21}, P_{22}$, in which the pixels are grouped so that the different pixels $P_{-7} \ldots P_7$ or $P_8 \ldots P_{22}$ respectively in a group $21_1$, and $21_2$ correspond to different views of the image. The sizes of the pixels within a group are preferably selected so as to vary as a function of viewing angle. In the preferred arrangement, the pixel sizes increase with increasing viewing angle.

The expression 'pixel sizes' or the 'sizes of pixels' as used herein may correspond to size by linear dimension such as width and height, or to size by areal dimensions of the pixels.

The display panel 20 may be any suitable electro-optical device in which an optical characteristic of each pixel $P_{-7} \ldots P_{22}$ can be varied according to an electrical control signal to generate an image. Preferably the display panel 20 is a liquid crystal display.

An illumination source having a plurality of discrete light sources $22a \ldots 22c$, so that each group 21 of pixels is positioned to receive light from a respective one of the light sources, is preferably provided. This may be by way of the areal light source 12 and mask 13 arrangement of FIG. 1, but could also be provided by way of a pixellated light source providing light sources 22 as lines of pixels, individual pixels or blocks of pixels.

Figure 9:
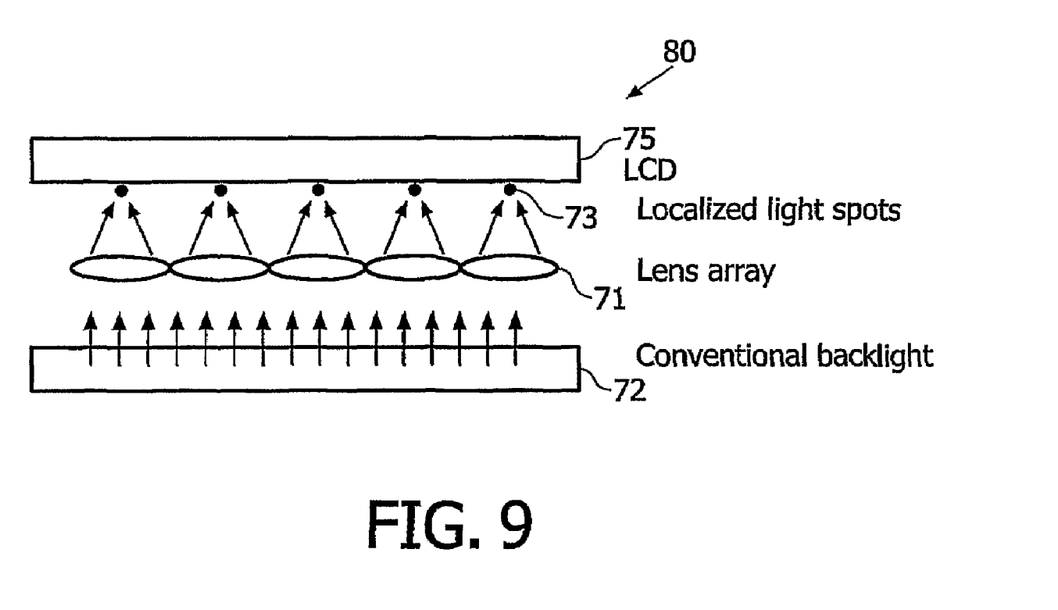
FIG. 9 shows an alternative form of light source suitable for use with the display device.

Still further, the plurality of discrete light sources could be virtual light sources provided by way of a backlight and lens array (e.g. a lenticular sheet array) providing a series of high intensity light spots. Such an arrangement is illustrated in FIG. 9, in which a display device 80 includes an LCD panel 75, areal light source 72 and a lens array 71. The lens array focuses light from the areal source 72 into a plurality of discrete focal points 73 just outside the plane of the LCD panel so that each illuminates a plurality of pixels in the LCD panel, similar to that described in connection with FIG. 1.

In the preferred arrangement as shown in FIG. 4, the pixels within a group $21_1$ have a central pixel $P_0$ positioned so as to correspond to a zero viewing angle with respect to the respective light source $22a$. The pixel sizes within the group are preferably selected so as to increase symmetrically on either side of the central pixel, so that the pixels ($P_{-7}, P_7$) farthest from the central pixel ($P_0$) are larger than the pixels ($P_{-1}, P_1$) closest to it.

In preferred arrangements, adjacent pixel groups $21_2$, $21_3 \ldots 21_n$ adopt the same pixel layout and pixel size variation as each other to construct an array of pixel groups to form the display panel 20.

It is to be appreciated however, that other pixel configurations may be adopted, for example, pixel sizes $p_n$ may increase from one side of the pixel group to the other and adjacent pixel groups may have a different pixel layout to other pixel groups. This of course will depend on the required effect to be displayed by the display device and on how the image is to be perceived by the intended viewer.

Figure 5:
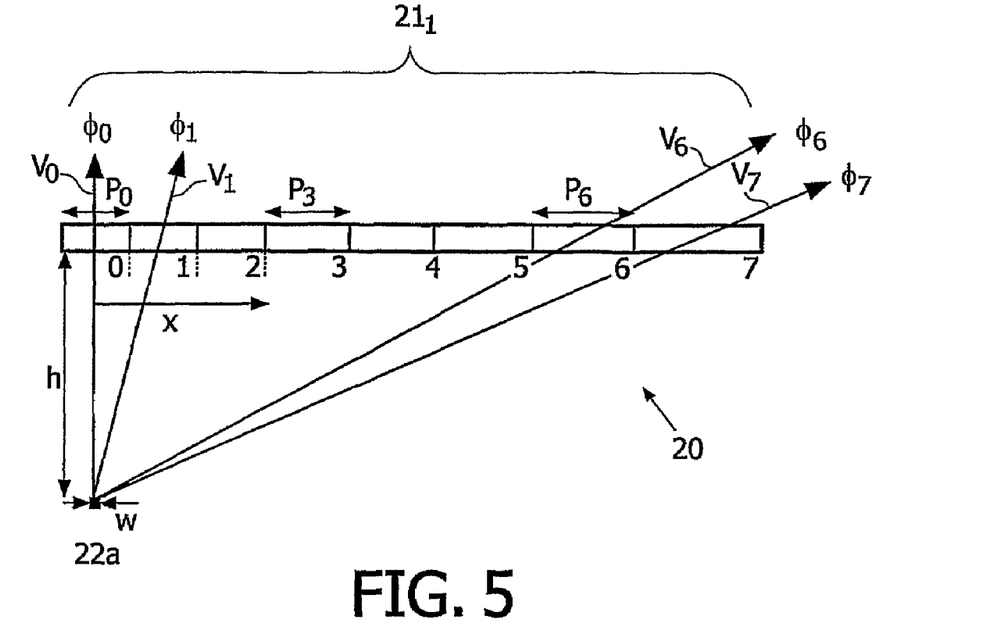
FIG. 5 shows a schematic cross-sectional view useful in illustrating the geometry of a parallax barrier LCD device incorporating the display panel of FIG. 4.

Part of a group $21_1$ of pixels in the present display panel 20 is shown in FIG. 5. A light source $22a$ of width w corresponds with, and can be viewed through, a group of pixels $P_0 \ldots P_7$ at respective viewing angles $\phi_0, \phi_1, \ldots \phi_7$ relative to the normal of the plane of the display panel. It will be understood that only approximately half of the pixel group $21_1$ is shown, a further seven pixels being present to the left of pixel $P_0$ to complete the pixel group $21_1$.

The pixels in the display panel 20 have varying widths e.g. $p_0 < p_3 < p_6$. The minimum separation between the back panel illumination source $22a$ and the display panel 20 is shown as h. In a preferred display device of the present invention, h=2.3 mm, $p_0$=200 microns, and w=50 microns although these values may be varied significantly.

In preferred arrangements, the pixel sizes $p_0 \ldots p_7$ are selected so as to increase according to the function:

$$p_n = 0.5h[\tan((n+1)\Delta\phi_{eye}) - \tan((n-1)\Delta\phi_{eye})] \quad \text{(Eq. 1)}$$

where $\Delta\phi_{eye}$ represents the angle subtended by the inter-ocular spacing of a human viewer, for example as determined by the average inter-ocular spacing of the normal human population—which is typically 6 cm. Since, in preferred practical applications, the viewing distance d between the viewer and the display panel 20 will be much greater than h (i.e. d>>h), $\Delta\phi_{eye}$ approximates to arctan (s/d) where s is the average inter-ocular spacing. Hence, for a given viewer, viewing the display device at a given distance d, $\Delta\phi_{eye}$ will be constant and the pixel sizes $p_n$ will be a function of view number n (Eq. 1).

According to Eq. 1, the pixel sizes $p_n$ within a group 21 will increase non-linearly with increasing viewing angle as a consequence of the trigonometric components, in the sense that the rate of increase (given by $dp_n/dn$ or $dp_n/d\phi_n$) also increases with viewing angle $\phi_n$.

As a consequence of varying the pixel sizes with increasing oblique viewing angle, the pixels farthest from the central pixel $p_0$ become sufficiently large to allow the viewing cones of the different views $V_0, V_1, \ldots, V_6, V_7$ of the light source 22a to be viewed without a reduction in brightness. In this preferred arrangement, the intensities of the different views are substantially normalised across all viewing angles $\phi_n$—provided the light source 22a is an isotropic emitter. If the brightness of view $V_0$ is normalised to 1, then the brightness for each view $V_n$ is given by the expression:

$$(\text{brightness view})_n = \Delta\phi_n/\Delta\phi_0 \quad \text{(Eq. 2)}$$

In varying the pixel sizes $p_n$ within a group 21 in accordance with equation 1 above, it is found that the angle between different views is substantially equalised, so that $\phi_n = n\Delta\phi_{eye}$ and $\Delta\phi_n = \Delta\phi_{eye}$=constant (i.e. independent of n). This is readily apparent in FIG. 5, such that the inter-view angles $\phi_1 - \phi_0 = \phi_7 - \phi_6 = \Delta\phi_{eye}$ despite $\phi_7$ and $\phi_6$ being oblique viewing angles.

In the preferred arrangement, by selecting the pixel sizes $p_n$ within a group 21 in accordance with equation 1, the position $x_n$ of the pixels within the group can be determined by the expression:

$$x_n = 0.5h[\tan(n\Delta\phi_{eye}) + \tan(n+1)\Delta\phi_{eye})] \quad \text{(Eq. 3)}$$

$\Delta\phi_{eye}$ again being given by arctan (s/d) and would be constant for a given viewer having inter-ocular separation s at a given viewing distance d.

Figure 6:
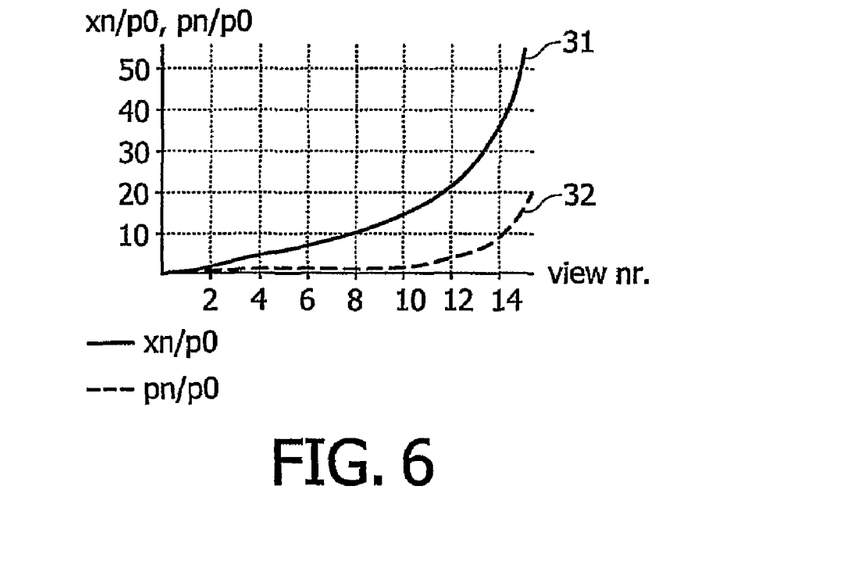
FIG. 6 shows a graph of pixel location and pixel size as a function of view number.

The values of $x_n$ and pixel size $p_n$ as a function of view number n (0, 1, ... 6, 7, n) are illustrated in FIG. 6 respectively as curves 31, 32. This is plotted for a typical arrangement based on a viewer having an inter-ocular separation s=6 cm at a viewing distance of d=70 cm, with h=2.3 mm, $p_0$=200 microns, w=50 microns and as can be seen, the pixels nearest to the central pixel have substantially the same size as the central pixel but increase markedly with progressively higher view number n. For example, the pixel giving rise to a view 15 is approximately 15 times larger in size than the central pixel.

It will be appreciated that in the case of an anisotropic light source 22a, adjustments to the pixel sizes $p_n$ within a group 21 could be made accordingly in order to determine the brightness profile of the views V as a function of n.

It is to be understood that the preferred embodiments are not limited to display panels having only an odd number of pixels per pixel group 21 and that embodiments involving an even number of pixels per pixel group are also possible. In fact, the display panel of the present invention may include a non-integer number of pixels per pixel group (e.g. where part of a pixel at an edge of the group is obscured). In embodiments having an even number or non-integer number of pixels per pixel group, Eqs 1 and 3 would require minor modification but would be similar in functional form to existing Eqs 1 and 3, giving rise to varying pixel sizes as already described. Hence, the corresponding equations are not reproduced herein for conciseness.

Figure 7:
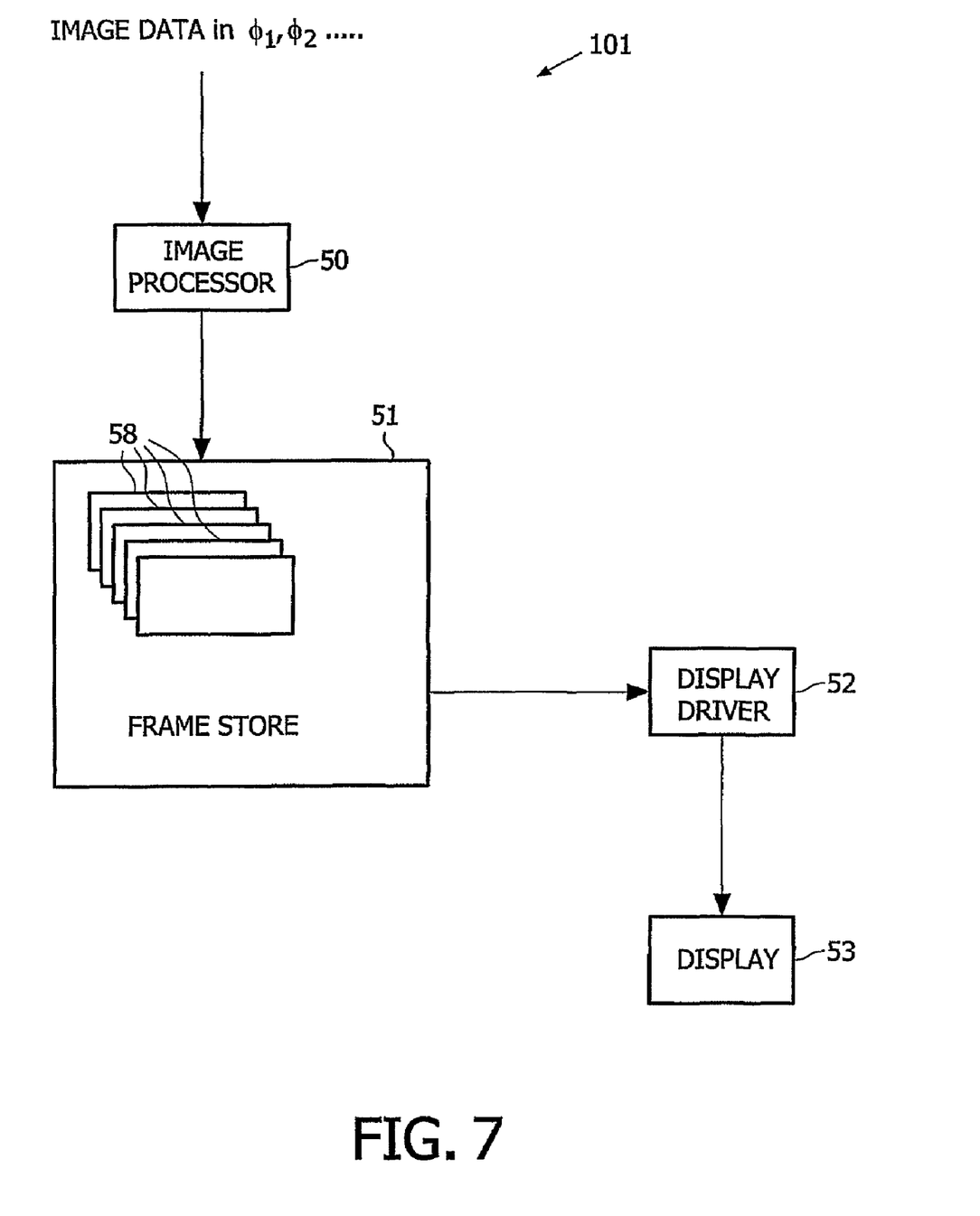
FIG. 7 shows a schematic block diagram of a display device according to embodiments of the present invention.

FIG. 7 shows a schematic exemplary embodiment of a display device 101 for use with a display panel 20 of the present invention.

An image processor 50 receives a stream of image information including intensity pixel data for each of a plurality of views V. The image information is processed and stored into a frame buffer 51 in digital form so that it can be rendered onto a display device 53 incorporating a present display panel 20. Frame buffer 51 includes a plurality of pages 58, each page including the pixel data for a respective view V.

The frame buffer 51 is accessed by a display driver 52 that provides appropriate drive voltage and/or current signals to each pixel of a display panel 20 in accordance with each of the stored values in frame store 51.

A particular advantage of the display panel 20 of the present invention is that it can be implemented with very little, if any, change in hardware from a conventional LCD driver arrangement. The functions of the image processor 50 can be realised in software, and the functions of the display driver 52 can also be realised as a software implementation.

Figure 8:
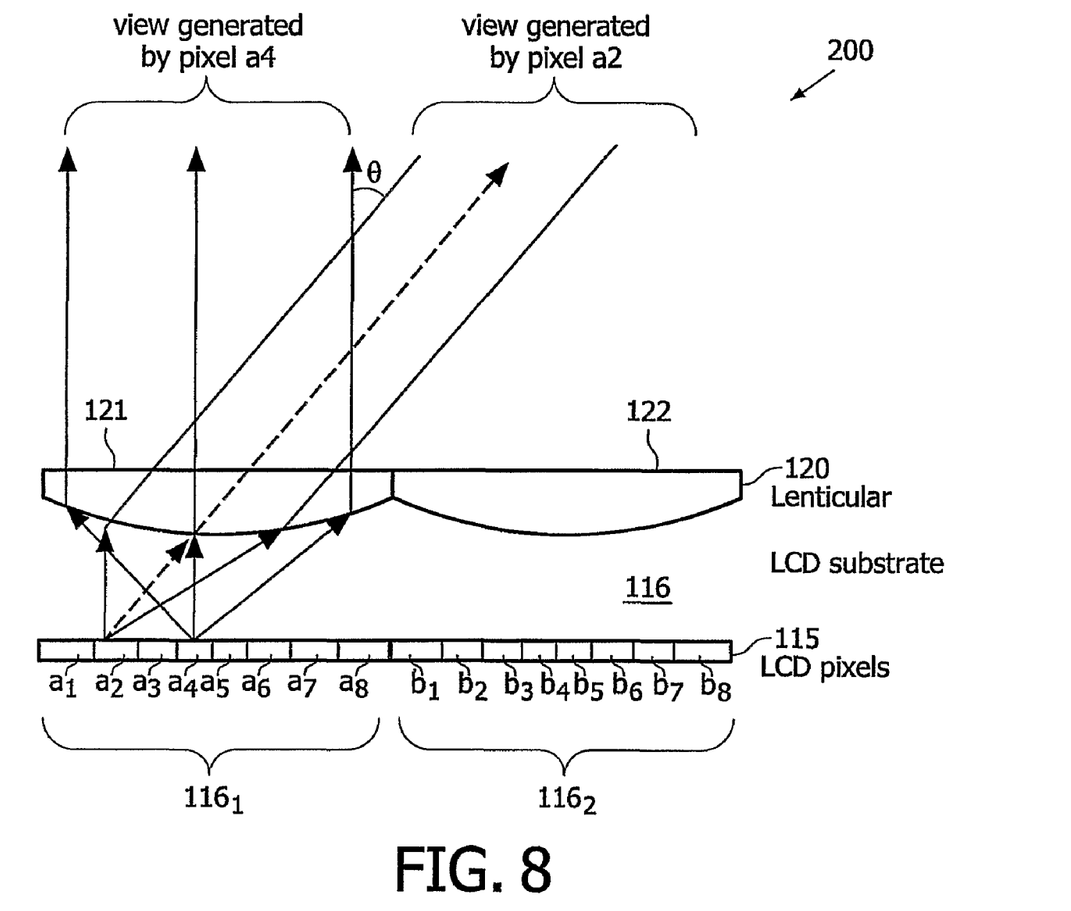
FIG. 8 shows an embodiment of the invention utilising a lenticular array.

It is also noted that the display panel 20 of the present invention as described herein may also be applied in other forms of 3D display other than that shown in FIG. 5. With reference to FIG. 8, it will be noted that the invention can also be applied to a lenticular 3D display device 200. In this lenticular display device, a liquid crystal display panel 115 includes a plurality of pixels ($a_1$ to $b_8$ are shown) of varying sizes arranged in groups $116_1$, $116_2$, in similar manner to that in FIG. 4. On top of the LCD array 115 is positioned a lenticular array 120 of cylindrical lenses 121, 122. The lenticular array may include any sheet of corrugated optical material, or array of discrete or joined lenses to provide localised focusing for groups of pixels of the LCD panel.

In the arrangement shown in FIG. 8, the width of each lens element is chosen to be eight pixels, corresponding to an eight-view 3D display. Of course, the width of each lens element may be chosen to correspond to different numbers of pixels of differing sizes according to the angular resolution required. The pixels $a_1$ to $a_8$ of the LCD are imaged into the different views. The problem of intensity dependency on angle which exists in existing lenticular 3D display devices is solved by the varying pixel size display panel 20 described in connection with FIGS. 4 and 5.

It will be recognised that the invention can be applied not only to transmissive display panel types, but also to reflective display panel types. Where the display panel provides for control of reflectivity of each of a plurality of pixels, the dependence of the reflectivity on the angle of the plane of the pixel to the light source will still exist and can be corrected for using the varying pixel size display panel 20 as described herein.

Figure 10:
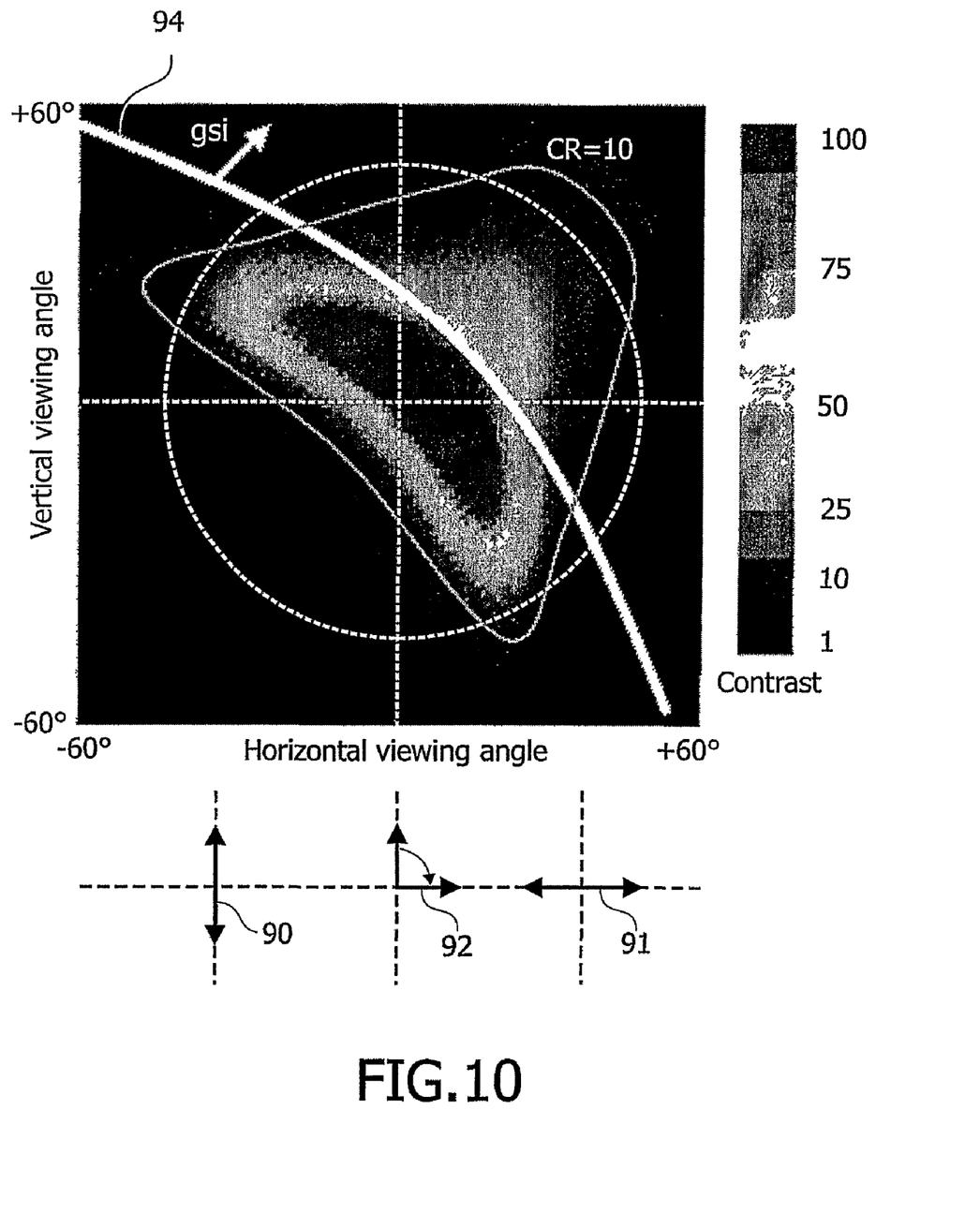
FIG. 10 shows a graph of viewing angle properties of a conventional liquid crystal display panel useful in illustrating display optimisation principles in accordance with the present invention.

The invention as described above also has important implications for the optimisation of liquid crystal displays generally. The viewing angle dependence of LCD panels is known generally to be rather poor. FIG. 10 illustrates how contrast and grey scale inversion depends upon viewing angle for a standard 90 degree twisted nematic (TN) transmissive LCD without compensation foil. The horizontal viewing angle is shown on the x-axis between −60 degrees and +60 degrees from the normal to the plane of the display, and the vertical viewing angle is shown on the y-axis between −60 degrees and +60 degrees from the normal to the plane of the display.

The orientations of the optical axes 90, 91 of the LCD polarisers and the optical axes 92 of the liquid crystal directors are shown in the lower part of the figure.

From FIG. 10, it is seen that the image quality strongly depends upon viewing angle. For the example shown in FIG. 10, the optimal viewing angles are represented by the curved diagonal line 94 running from top left to bottom right, and grey scale inversion occurs for viewing positions to the right and above the line 94.

Conventionally, for most important applications such as televisions and computer monitors, it is recognised that maximising performance for horizontal viewing directions is more important than maximising performance for vertical viewing directions. For example, for television applications, multiple viewers of a display device will normally be arranged with their eye levels more-or-less consistent relative to the screen (i.e. with very little variation along the y-axis), but their horizontal viewing angles relative to the x-axis may vary significantly. Similarly, a user seated at a computer monitor is more likely to vary head position along the x-axis while working, than along the y-axis.

According to convention, therefore, the LCD would be rotated anticlockwise through 45 degrees from the orientation shown in FIG. 10, such that its polarisation axes are at approximately 45 degrees to the x- and y-axes of the display when in use. In this way, the performance of the display device is optimised for horizontal viewing angles, but is compromised for vertical viewing angles.

3D LCD displays suffer from the same problems with optimisation of viewing angle dependency in respect of x and y directions.

However, in the present invention, it is recognised that optimisation of brightness rendering can be achieved by using a display panel having varying pixel sizes as described above.

Therefore, it is more appropriate to provide the display device with an orientation in which the inherent optical characteristics of the display panel are optimised for vertical viewing angle variations. Horizontal viewing angle variations are accommodated for and optimised using the display panel 20 as described herein.

Thus, in a preferred arrangement, the 3D display device described above is arranged so that, in normal use, it has the pixels within each group 21 that provide different views V as a function of angle to a first axis of the display panel 20, and has the polarising elements of the display panel 20 oriented so as to minimise viewing angle dependence relative to a second axis of the display, where the second axis is orthogonal to the first axis.

In a most general sense, the inherent optical characteristics of the display panel are such that viewing angle dependence is reduced or substantially minimised relative to the y-axis and the present display panel 20 serves to substantially eliminate viewing angle dependence relative to an axis that is transverse to the y-axis. More preferably, the present display panel 20 serves to substantially eliminate viewing angle dependence relative to an axis that is orthogonal to the y-axis (i.e. the x-axis). In a most preferred device, the x-axis is defined as the horizontal axis when the display is in normal use, and the y-axis is defined as the vertical axis when the display is in normal use.

Other embodiments are intentionally within the scope of the accompanying claims.

The invention claimed is:

1. A display device for displaying a three dimensional image such that different views are displayed according to the viewing angle, the display device including:
    a display panel (20) having a plurality of separately addressable pixels ($p_{-7} \ldots p_{22}$) for displaying said image, the pixels being grouped such that different pixels in a group (21) along a first axis correspond to different views of the image, each pixel in a group being positioned relative to a respective discrete light source (22) and each pixel being separately controllable to vary an optical characteristic of each pixel to generate an image according to received image data;
    wherein the sizes of the pixels within a group vary as a function of the viewing angle of the pixels with respect to the respective light source along the first axis as:

$$0.5h[\tan((n+1)\Delta\phi_{eye}) - \tan((n-1)\Delta\phi_{eye})]$$

where n is the pixel position from the central pixel (0, 15) of the group, h is the orthogonal separation of the light source to the plane of the group of pixels and $\Delta\phi_{eye}$ is the angular separation between the left and right human eye, wherein $\Delta\phi_{eye}$ approximates to arctan (s/d), where s is the average inter-ocular spacing between the left and right eyes and d is the viewing distance between the viewer and the display device; and
    polarizing elements of said display panel are oriented so as to minimize viewing angle dependence relative to a second axis, wherein said second axis is orthogonal to the first axis.

2. The display device of claim 1 in which the sizes of the pixels within a group (21) increase with increasing viewing angle.

3. The display device of claim 1 in which the sizes of the pixels within a group (21) increase nonlinearly with increasing viewing angle.

4. The display device of claim 2 in which the increasing pixel sizes within a group (21) are adapted to render the angular size of view of the respective light son (22) independent of the viewing angle.

5. The display device of claim 2 in which the increasing pixel sizes within a group (21) are adapted to substantially normalise the intensities displayed by each pixel in the group so as to be independent of viewing angle.

6. The display device of claim 1 in which each pixel group (21) includes a central pixel (0, 15) positioned to correspond to zero viewing angle.

7. The display device of claim 6 in which the pixel sizes in a group (21) increase either side of the central pixel (0, 15).

8. The display device of claim 7 in which the pixel sizes increase symmetrically on either side of the central pixel (0, 15).

9. The display device of claim 1 further including a back panel (11) for providing a plurality of said discrete light sources (14, 22), each group (21) of pixels in the display panel (20) being positioned to receive light from a respective one of the discrete light sources.

10. The display device of claim 9 in which the back panel (11) provides a plurality of line sources of illumination.

11. The display device of claim 9 in which the back panel (11) provides a plurality of point sources of illumination.

12. The display device of claim 1 further including a display driver (52) for controlling said optical characteristic of each pixel within a group.

13. The display device of claim 10 in which the display panel (20) is a light-transmissive display panel adapted for viewing from a side opposite to the side on which the back panel (11) is located.

14. The display device of claim 1 further including a lenticular array (120) positioned adjacent to the display panel (20), each lenticle (121) within the array focusing light from selected pixels in the display panel.

15. The display device of claim 14 in which each lenticle (121) within the array (120) is associated with a said group (116) of pixels.

16. The display device of claim 1 in which the optical characteristic is a light transmission characteristic and the display driver (52) is adapted to control the amount of light passing through each pixel according to an image to be displayed.

17. The display device of claim 16 incorporated into an object, in which the second axis is defined as the vertical axis when the object is in normal use.

18. A method for displaying a three dimensional image on a display device such that different views of the image are displayed according to the viewing angle, the method comprising the step of:

processing image data to form pixel intensity data values for each one of a plurality of separately addressable pixels ($P_{-7} \ldots P_{22}$) in a display panel (20), the pixels being grouped such that different pixels in a group (21) along a first axis correspond to different views of the image, and each pixel in a group being positioned relative to a respective discrete light source (22), the pixel intensity data values each for controlling an optical characteristic of a respective pixel to generate the image;

wherein the sizes of the pixels within a group vary as a function of the viewing angle of the pixels with respect to the respective light source along the first axis as:

$$0.5h[\tan((n+1)\Delta\phi_{eye}) - \tan((n-1)\Delta\phi_{eye})]$$

where n is the pixel position from the central pixel (0, 15) of the group, h is the orthogonal separation of the light source to the plane of the group of pixels and $\Delta\phi_{eye}$ is the angular separation between the left and right human eye, wherein $\Delta\phi_{eye}$ approximates to arctan (s/d), where s is the average inter-ocular spacing between the left and right eyes and d is the viewing distance between the viewer and the display device; and polarizing elements of said display panel are oriented so as to minimize viewing angle dependence relative to a second axis, wherein said second axis is orthogonal to the first axis.

19. The method of claim 18 in which the pixel sizes within a group (21) are varied by increasing at least one of a linear or areal dimension of the pixels.

20. the method of claim 19 in which the pixel sizes within a group (21) are selected to render the angular size of view of the respective light source (22) independent of the viewing angle.

21. The method of claim 19 in which the pixel sizes within a group (21) are selected to substantially normalise intensities displayed by each pixel in the group so as to be independent of viewing angle.

22. The method of claim 18 in which the optical characteristic is a light transmission characteristic and a display driver (52) is adapted to control the amount of light passing through each pixel according to an image to be displayed.

23. The method of claim 18 in which the second axis is the vertical axis when the display panel (20) is in normal use.

24. A display device for displaying a three dimensional image such that different views are displayed according to the viewing angle, the display device including:

a display panel (20) having a plurality of separately addressable pixels ($p_{-7} \ldots p_{22}$) for displaying said image, the pixels being grouped such that different pixels in a group (21) correspond to different views of the image, each pixel in a group being positioned relative to a respective discrete light source (22) and each pixel being separately controllable to vary an optical characteristic of each pixel to generate an image according to received image data;

wherein the sizes of the pixels within a group increases according to the function:

$$0.5h[\tan((n+1)\Delta\phi_{eye}) - \tan((n-1)\Delta\phi_{eye})]$$

where n is the pixel position from the central pixel (0, 15) of the group, h is the orthogonal separation of the light source to the plane of the group of pixels and $\Delta\phi_{eye}$ is the angular separation between the left and right human eye, wherein $\Delta\phi_{eye}$ approximates to arctan (s/d), where s is the average inter-ocular spacing between the left and right eyes and d is the viewing distance between the viewer and the display device.

* * * * *